United States Patent Office 2,931,846
Patented Apr. 5, 1960

2,931,846

ELECTRIC BATTERY PLATE

William A. Cunningham and Leo E. Pucher, South Euclid, Ohio, assignors to The Electric Storage Battery Company, a corporation of New Jersey No Drawing. Application September 10, 1956
Serial No. 608,674

4 Claims. (Cl. 136—30)

The invention relates to electric batteries and, more particularly, to a new and improved negative plate for use in silver-zinc batteries containing an alkaline electrolyte, and to improved methods of producing such a plate.

In the past it has been conventional practice in the battery industry to produce negative plates of the type containing metallic zinc as an active material, such material being zinc oxide when in the discharged or unformed condition, by preparing a mix of zinc oxide in powdered form and thoroughly dispersing a limited amount of water throughout this powder to produce a paste. The pasty material is then applied to a metallic, electrically conductive screen or grid, the product then being dried. Insertion of the plate into an electrolytic bath and passage of an electric current therethrough brings about the conversion of the zinc oxide to metallic zinc.

It has been discovered, however, that the product of such a process is relatively weak and tends to disintegrate not only by reason of the handling encountered during manufacturing operations but also within the battery itself after assembly. In an effort to overcome this defect and to produce a plate that can be satisfactorily and economically produced without substantial scrap loss, it has heretofore been suggested, as in co-pending application Serial No. 480,621, filed January 7, 1955, now U.S. Patent No. 2,880,258, as a continuation-in-part of Serial No. 390,709, filed November 21, 1952, now abandoned, both applications being assigned to the assignee of the present application, to prepare the negative paste by mixing the zinc oxide powder with an aqueous solution of potassium hydroxide. As set forth in such applications, the exact chemical reaction is unknown but it is felt that some type of potassium zincate complex is set up whereby a bond is formed between the particles of the active material thereby improving the mechanical stability of the plate.

Although this product and process have been eminently satisfactory from the purely manufacturing and mechanical standpoints, there has been presented by the use of this process a major safety problem in the manufacturing operations insofar as personnel are concerned. Since there is involved the use of a strong potassium hydroxide solution, extreme measures must be taken to prevent contact of this solution with unprotected parts of the body of those employees involved in the operation. An additional disadvantage to said process is that the potassium hydroxide in the dry plate prior to formation tends to absorb carbon dioxide from the atmosphere thereby forming potassium carbonate within the plate which seriously interferes with the reduction of the unformed zinc oxide to the formed metallic zinc. Accordingly, it has been impossible to store the plates in a dry unformed condition for any period of time thereby eliminating stock piling of plates during slack periods in anticipation of periods of peak production.

Accordingly, it is an object of the invention to provide a negative plate for electric batteries of the silver-zinc type which will be mechanically strong, producible by ordinary production processes, will not present a safety problem, and will not enter into harmful reactions when exposed to the atmosphere between the pasting and drying or forming operations.

Other objects of the invention will be apparent from the description and claims that follow.

To accomplish the objects of the invention there is utilized a small amount of a material such as carboxymethyl cellulose which will provide a sufficient gelling action to maintain the dry zinc oxide particles firmly in contact with each other and with the metallic screen or grid to which the paste is applied to form a negative plate.

In attaining this result we may use preferably about 0.125 gram of dry, powdered carboxymethyl cellulose or derivatives thereof in about 100 cubic centimeters of water thereby providing an aqueous solution containing about 0.125% of the gelling agent. The prepared solution is then added to dry zinc oxide powder and thoroughly mixed therewith to form a pasty mass containing about 70% by weight of dry zinc oxide powder to about 30% by weight of the gelling solution. This paste can then be applied either by hand or by machine in any conventional way to the usual conducting screen or grid that has previously been prepared in the shape and dimensions desired in the final plate. Following pasting of the metallic screen the plate is dried to remove any water therefrom. At this point the plate can either be immediately assembled with other similarly prepared plates and electrolytically reduced to highly porous active sponge zinc in an alkaline bath or the plates can be stored for long periods of time prior to assembly without harmful chemical reactions occurring therewithin.

It will be understood, of course, that the amounts of carboxymethyl cellulose can be varied from the 0.125% solution described above, it having been found satisfactory to use aqueous solutions containing from about 0.05% to about 0.25% of the carboxymethyl cellulose powder. Additionally, the paste to be applied to the screen can contain from about 80% to about 60% by weight of dry zinc oxide powder and from about 20% to about 40% of the gelling agent solution, the properties of the final plate being advantageous within the aforementioned range.

The dried plate will contain carboxymethyl cellulose in an amount of from about 0.01% to about 0.06% by weight of the dry zinc oxide, the range of from about 0.03% to about 0.05% being preferred.

The foregoing description is meant to be exemplary only and other forms and variations of the invention coming within the scope of the appended claims will be apparent to those skilled in the art.

We claim:

1. A pasted type negative plate for electric batteries of the silver-zinc type comprising a metallic conducting screen, said screen bearing an active material mass consisting of zinc oxide, and carboxymethyl cellulose dispersed throughout said zinc oxide in an amount of from about 0.01% to about 0.06% by weight of dry zinc oxide.

2. The negative plate of claim 1 in which the carboxymethyl cellulose is present in an amount of from about 0.03% to about 0.05%.

3. The method of producing negative plates for use in electric batteries of the silver-zinc type comprising the steps of preparing an aqueous solution containing from about 0.05% to about 0.25% by weight of carboxymethyl cellulose, thoroughly mixing said aqueous solution with dry zinc oxide powder to produce a mix containing from about 60% to about 80% of said dry powder, applying said mix to a metallic screen to produce a plate, and drying said plate.

4. A method of producing negative plates for use in electric batteries of the silver-zinc type comprising the steps of preparing an aqueous solution containing from about 0.10% to about 0.15% of carboxymethyl cellulose, mixing said solution with dry zinc oxide powder in the proportion of about 70% of zinc oxide and about 30% of said solution, working the mix to form a pasty mass, pasting said mass upon a metallic screen to form a battery plate, and drying said plate.

References Cited in the file of this patent

UNITED STATES PATENTS

| | | |
|---|---|---|
| 1,929,357 | Johnstone | Oct. 3, 1933 |
| 2,542,574 | Ruben | Feb. 20, 1951 |
| 2,561,943 | Moulton et al. | July 24, 1951 |
| 2,640,864 | Fischbach | June 2, 1953 |
| 2,669,594 | Andre | Feb. 16, 1954 |
| 2,677,713 | Weil et al. | May 4, 1954 |
| 2,738,375 | Schlotter | Mar. 13, 1956 |
| 2,828,351 | Rade | Mar. 25, 1958 |